United States Patent
Smith

(10) Patent No.: US 11,186,322 B2
(45) Date of Patent: Nov. 30, 2021

(54) CURVED QUARTER FENDER ROCK GUARD

(71) Applicant: PACCAR Inc, Bellevue, WA (US)

(72) Inventor: Jeffrey P. Smith, Prosper, TX (US)

(73) Assignee: PACCAR Inc, Bellevue, WA (US)

( * ) Notice: Subject to any disclaimer, the term of this patent is extended or adjusted under 35 U.S.C. 154(b) by 699 days.

(21) Appl. No.: 15/989,000

(22) Filed: May 24, 2018

(65) Prior Publication Data

US 2019/0359264 A1 Nov. 28, 2019

(51) Int. Cl.
*B62D 35/00* (2006.01)
*B62D 25/16* (2006.01)
*B62D 25/18* (2006.01)

(52) U.S. Cl.
CPC ........... *B62D 25/18* (2013.01); *B62D 25/168* (2013.01); *B62D 35/001* (2013.01)

(58) Field of Classification Search
CPC ...... B62D 35/001; B62D 25/16; B62D 25/18; B62D 25/168
See application file for complete search history.

(56) References Cited

U.S. PATENT DOCUMENTS

| | | | |
|---|---|---|---|
| 2,933,344 A | 4/1960 | Shumaker | |
| 3,337,238 A | 8/1967 | Weasel, Jr. | |
| 3,580,604 A | 5/1971 | Overend | |
| 3,584,898 A | 6/1971 | Pearson et al. | |
| 4,062,580 A | 12/1977 | West | |
| D263,463 S | 3/1982 | Durben | |
| 4,366,530 A | 12/1982 | Milhous | |
| 4,377,294 A | 3/1983 | Lockwood et al. | |
| 4,591,178 A | 5/1986 | Mortvedt et al. | |
| 4,706,980 A | 11/1987 | Hawes et al. | |
| 4,735,428 A | 4/1988 | Antekeier | |
| 4,740,003 A | 4/1988 | Antekeier | |
| D303,237 S | 9/1989 | Hawes et al. | |
| D303,238 S | 9/1989 | Antekeier | |
| 5,139,285 A | 8/1992 | Lasinski | |
| D331,560 S | 12/1992 | Ivey | |
| 5,190,342 A * | 3/1993 | Marlowe | B62D 35/001 280/423.1 |

(Continued)

FOREIGN PATENT DOCUMENTS

| | | |
|---|---|---|
| DE | 202015102693 U1 | 9/2015 |
| EP | 1564115 A2 | 8/2005 |

(Continued)

OTHER PUBLICATIONS

"Class Pays," Peterbilt Motors Company, Denton, Texas, Sep. 1997, 10-page brochure.

(Continued)

*Primary Examiner* — Steve Clemmons
(74) *Attorney, Agent, or Firm* — Seed IP Law Group LLP

(57) ABSTRACT

A quarter panel is configured for use with a vehicle having a forward end, a wheel, and a vertical surface located forward of the wheel. The quarter fender assembly includes a quarter fender in the form of an arcuate panel. The quarter panel is sized and configured to be mounted to the vehicle between the wheel and the vertical surface. The quarter panel assembly further includes a flexible flap mounted to an upper portion of the quarter fender. The flap has an at least partially arcuate forward surface.

18 Claims, 6 Drawing Sheets

(56) References Cited

U.S. PATENT DOCUMENTS

| | | |
|---|---|---|
| D345,333 S | 3/1994 | Roman |
| D346,577 S | 5/1994 | Roman |
| 5,340,154 A | 8/1994 | Scott |
| D366,640 S | 1/1996 | Tucker et al. |
| 5,564,750 A | 10/1996 | Bajorek et al. |
| D375,927 S | 11/1996 | Quintana et al. |
| D377,160 S | 1/1997 | Murkett |
| D382,844 S | 8/1997 | Norwood et al. |
| 5,697,644 A | 12/1997 | Logan et al. |
| D401,198 S | 11/1998 | Mueller et al. |
| 5,924,735 A | 7/1999 | Meyer, Jr. |
| D412,689 S | 8/1999 | Onopa |
| D422,957 S | 4/2000 | Damon et al. |
| 6,070,908 A | 6/2000 | Skrzypchak |
| D431,806 S | 10/2000 | Damon et al. |
| D433,980 S | 11/2000 | Conway et al. |
| D434,358 S | 11/2000 | Conway et al. |
| 6,152,469 A | 11/2000 | Gadowski |
| 6,205,642 B1 | 3/2001 | Czirmer |
| D450,277 S | 11/2001 | Onopa |
| 6,336,677 B2 | 1/2002 | Scott |
| D460,023 S | 7/2002 | Beigel |
| D465,749 S | 11/2002 | Beigel |
| D466,450 S | 12/2002 | Maher et al. |
| D482,993 S | 12/2003 | Conway et al. |
| D483,312 S | 12/2003 | Saleen |
| D488,112 S | 4/2004 | Satou |
| D490,749 S | 6/2004 | Satou et al. |
| D492,921 S | 7/2004 | Perfetti et al. |
| D494,900 S | 8/2004 | Satou |
| D494,912 S | 8/2004 | Perfetti et al. |
| 6,802,517 B1 | 10/2004 | Wuthrich |
| D502,904 S | 3/2005 | Delashaw et al. |
| D504,642 S | 5/2005 | Perfetti et al. |
| D511,727 S | 11/2005 | Shaw et al. |
| 7,036,616 B1 | 5/2006 | Kejha |
| D531,946 S | 11/2006 | Angelo et al. |
| D545,253 S | 6/2007 | Jones |
| D545,255 S | 6/2007 | Angelo et al. |
| D560,149 S | 1/2008 | Leclercq |
| D563,853 S | 3/2008 | Rosen et al. |
| D566,635 S | 4/2008 | Rosen et al. |
| D591,657 S | 5/2009 | Golden et al. |
| D602,414 S | 10/2009 | Sunbeam |
| D602,415 S | 10/2009 | Sunbeam |
| D602,828 S | 10/2009 | Sunbeam |
| D602,829 S | 10/2009 | Sunbeam |
| D610,511 S | 2/2010 | Dubanowski et al. |
| D615,472 S | 5/2010 | Maher et al. |
| D621,756 S | 8/2010 | Angelo et al. |
| D623,103 S | 9/2010 | Braga |
| 7,874,592 B2 | 1/2011 | Eklund et al. |
| D633,016 S | 2/2011 | Iuchi |
| 7,922,235 B1 * | 4/2011 | Smith .................. B62D 35/005 296/180.2 |
| D643,352 S | 8/2011 | Hjorten et al. |
| D647,016 S | 10/2011 | Medina et al. |
| 8,118,329 B2 | 2/2012 | Braga |
| D662,443 S | 6/2012 | Voss |
| D684,908 S | 6/2013 | Lee |
| D694,683 S | 12/2013 | Lee |
| D694,684 S | 12/2013 | Lee |
| D694,685 S | 12/2013 | Lee |
| D697,844 S | 1/2014 | Conway et al. |
| D697,845 S | 1/2014 | Conway et al. |
| D697,846 S | 1/2014 | Conway et al. |
| D700,120 S | 2/2014 | Lee |
| D700,552 S | 3/2014 | Lee |
| D707,164 S | 6/2014 | Lee |
| D708,104 S | 7/2014 | Conway et al. |
| D709,421 S | 7/2014 | Conway et al. |
| D710,771 S | 8/2014 | Hovind et al. |
| 8,814,253 B1 | 8/2014 | Butler et al. |
| D712,324 S | 9/2014 | McFarlin et al. |
| 8,876,164 B2 | 11/2014 | Eklund et al. |
| D719,885 S | 12/2014 | Conway et al. |
| D726,095 S | 4/2015 | Simecek et al. |
| 9,248,868 B2 | 2/2016 | Stojkovic et al. |
| D753,039 S | 4/2016 | Duncan et al. |
| 9,434,419 B1 | 9/2016 | Casto, Jr. et al. |
| 2001/0033095 A1 | 10/2001 | Scott |
| 2002/0158460 A1 | 10/2002 | Logan |
| 2007/0187940 A1 | 8/2007 | Presby |
| 2009/0167011 A1 | 7/2009 | Braga |
| 2010/0078927 A1 | 4/2010 | Takeuchi |
| 2010/0253034 A1 | 10/2010 | Crismon et al. |
| 2011/0304129 A1 | 12/2011 | Owens |
| 2012/0038127 A1 | 2/2012 | Bybee |
| 2013/0088039 A1 | 4/2013 | Feight et al. |
| 2013/0193300 A1 | 8/2013 | Eklund et al. |
| 2014/0070523 A1 | 3/2014 | Shih |
| 2015/0151794 A1 | 6/2015 | Gray |
| 2015/0239506 A1 | 8/2015 | Gust |
| 2015/0274214 A1 | 10/2015 | Riddick |
| 2015/0307142 A1 * | 10/2015 | Layfield ............... B62D 25/161 280/476.1 |
| 2015/0344076 A1 | 12/2015 | Rosenbecker et al. |
| 2018/0015966 A1 * | 1/2018 | Tongue ................ B62D 35/001 |

FOREIGN PATENT DOCUMENTS

| | | |
|---|---|---|
| JP | 2007-223397 A | 9/2007 |
| JP | 2008-296819 A | 12/2008 |

OTHER PUBLICATIONS

"Class Pays," Peterbilt Motors Company, Denton, Texas, Nov. 1998, 10-page brochure.

"Class Pays, Medium Duty," Peterbilt Motors Company, Denton, Texas, Sep. 2000, 12-page brochure.

"Class Pays, Truck Models," Peterbilt Motors Company, Denton, Texas, Mar. 2005, 24-page brochure.

Freightliner RH Quarter Fender, by freightliner_used_parts, ebay [online], published May 9, 2016, [retrieved on Oct. 10, 2016]. Retrieved from the Internet. <URL: http://www.ebay.com/itm/Freightliner-RH-Quarter-Fender-w-Accent-Light-Cutouts-P-N-A18-63565-001-/271962816886>.

"Model 377A/E," Peterbilt Motors Company, Denton, Texas, Jan. 1995, 6-page brochure.

"Model 379," Peterbilt Motors Company, Denton, Texas, Mar. 1996, 5-page brochure.

"Model 385," Peterbilt Motors Company, Denton, Texas, Oct. 1996, 5-page brochure.

"Model 357, New Sloped Hood," Peterbilt Motors Company, Denton, Texas, May 2002, 2-page brochure.

"TRP Chrome Plated and Stainless Steel Accessories," Overdrive, Jan. 25, 2012 <http://www.overdriveonline.com/trucking-gear/trp-chrome-plated-and-stainless-steel-accessories/> [retrieved Apr. 12, 2016], 1 page.

* cited by examiner

CURVED QUARTER FENDER ROCK GUARD

BACKGROUND

Motor vehicles, and in particular trucks, are a critical component of the system for transporting materials, goods and people from place to place. The amount of energy required to move such vehicles depends on many factors. For instance, a substantial amount of energy is expended to overcome the resistance encountered in moving the vehicle through air. The amount of energy expended depends in large part on the aerodynamic drag force exerted on the vehicle by the air. A vehicle moving through air experiences a drag force, which may be divided into two components: frictional drag and pressure drag. Frictional drag comes from friction generated generally through the boundary layer as the vehicle passes through the air. Pressure drag results from the net pressure forces exerted as the air flows around the vehicle. A substantial component of the pressure drag is associated with the formation of a low pressure zone behind the vehicle, as evidenced by the formation of a wake behind the vehicle.

The distinction between frictional drag and pressure drag is useful because the two types of drag are due to different flow phenomena. Frictional drag is typically most important for attached flows that is, where the flow boundary layer has not separated from the vehicle surfaces, and is related to the surface area exposed to the flow. Pressure drag dominates for separated flows, and is generally related to the cross-sectional area of the vehicle facing the air flow. When the drag on the vehicle is dominated by pressure drag forces, it will expend far more energy traveling through air than the same vehicle dominated by friction drag forces. It is therefore advantageous in the design of a vehicle to reduce pressure drag forces, thereby increasing the aerodynamic properties and efficiency of the vehicle.

A tractor-trailer combination is a vehicle known to experience high aerodynamic drag. Generally described, tractor-trailer combinations typically include a tractor having a so-called fifth wheel by which a box-like semi-trailer may be attached to the tractor by an articulated connection for transportation of the semi-trailer. By providing the articulated connection, a space or gap is formed between the rear wall of the tractor cab and the forward wall of the semi-trailer, as well between the lower surface of the semi-trailer and the deck plate of the tractor. It is well known that such gaps cause wake regions and, as a result, pressure drag.

SUMMARY

A first representative embodiment of a claimed quarter fender assembly is configured for use with a vehicle having a forward end, a wheel, and a vertical surface located forward of the wheel. The quarter fender assembly includes a quarter fender in the form of an arcuate panel. The quarter panel is sized and configured to be mounted to the vehicle between the wheel and the vertical surface. The quarter panel assembly further includes a flexible flap mounted to an upper portion of the quarter fender. The flap has an at least partially arcuate forward surface.

A second representative embodiment of a claimed quarter fender assembly configured for use with a tractor-trailer combination. The tractor has a wheel positioned aft of a cab portion and is configured to have a trailer coupled thereto. The trailer has a lower surface positioned above the wheel when the trailer is coupled to the tractor. The quarter fender assembly includes a quarter fender comprising an arcuate panel sized and configured to be mounted to the vehicle forward of the wheel and below the lower surface of the tractor trailer. The quarter panel assembly further includes a flexible flap mounted to an upper portion of the quarter fender and extending upward toward the lower surf ace of the trailer. The flap has an at least partially arcuate forward surface.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

The following discussion provides examples of systems and methods for improving the aerodynamic efficiency (e.g., reduce drag) on vehicles. Several embodiments of the present disclosure are directed to systems that utilize one or more fairings, deflectors, fins, seals, plates, etc., on one or more sections of a vehicle, such as a semi-truck, sometimes referred to as a tractor, a semi-trailer, a tractor-trailer combination, etc., for reducing the aerodynamic drag thereon. As will be described in more detail below, one example of a drag reducing device includes a flap located in proximity of the "fifth wheel" interface between the tractor and trailer.

Non-limiting examples of vehicles that may benefit from the aerodynamic devices and methods of the present disclosure include but are not limited to light, medium, and heavy duty trucks, recreational and vocational vehicles, buses, etc., just to name a few. Although embodiments of the present disclosure will be described with reference to a Class 8 truck, trailer, and/or combination, and while the system of aerodynamic devices, separate components thereof, may find their primary use on medium and heavy duty trucks and associated trailers, one skilled in the relevant art will appreciate that the disclosed embodiments are illustrative in nature and, therefore, should not be construed as limited to applications with Class 8 trucks. It should therefore be apparent that one or more of the aerodynamic components of the present disclosure can have wide application, and may be used in any situation where reducing the drag of any type of a vehicle is desirable.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. Further, it will be appreciated that embodiments of the present disclosure may employ any combination of features described herein.

Figure 1:
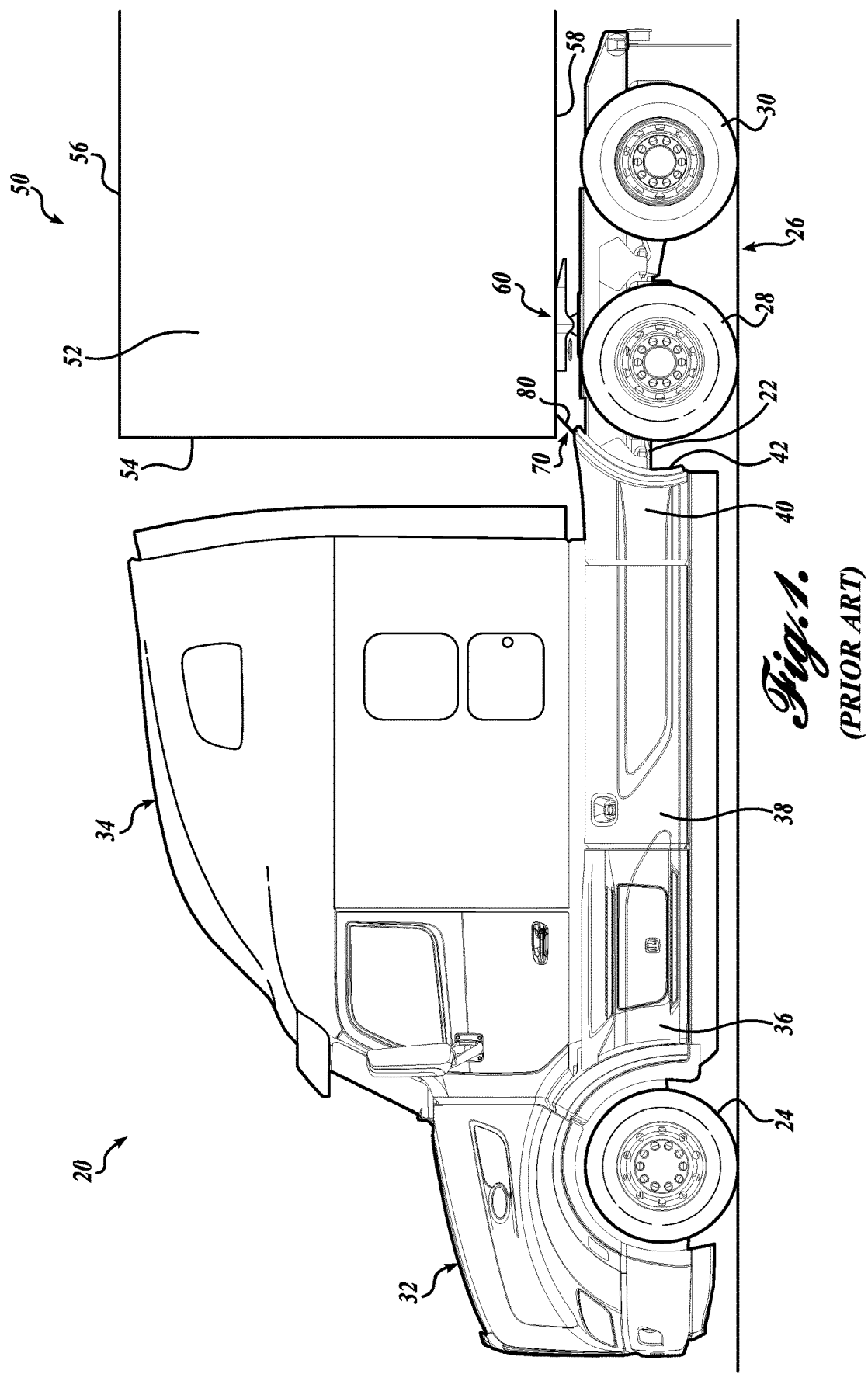
FIG. 1 is a side plan view of a known vehicle combination, such as an "over the road" tractor-trailer combination, wherein the vehicle has a known quarter fender flap.
Figure 2:
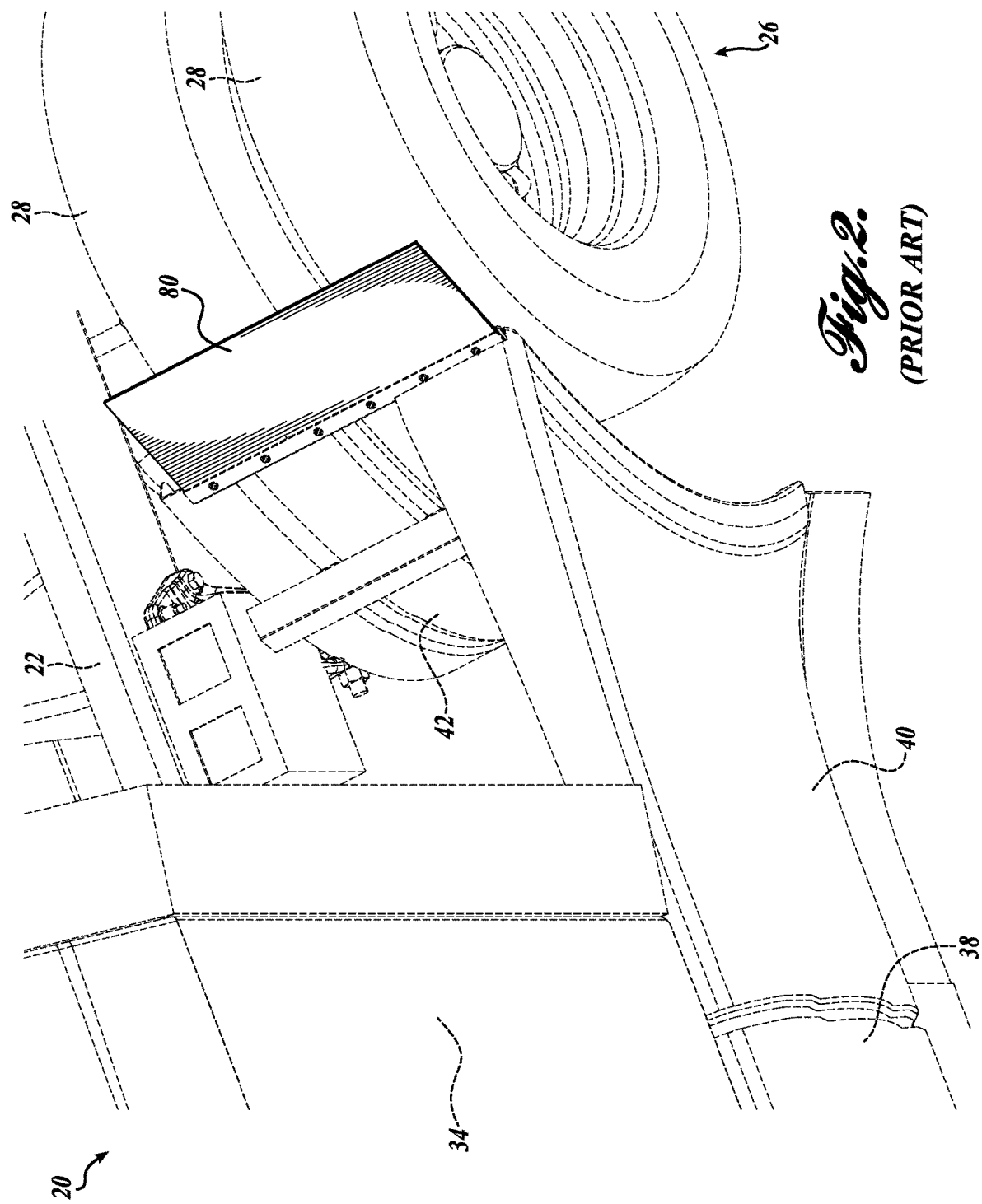
FIG. 2 is an isometric view of a quarter fender flap shown in FIG. 1.

FIGS. 1 and 2 illustrate a known combination of a lead vehicle 20 in the form of a heavy duty tractor and a trailing vehicle 50 in the form of a semi-trailer or trailer. The tractor 20 comprises a chassis 22 supported by wheels 24 of a front wheel assembly and a rear wheel assembly 26 having forward and rear wheels 28 and 30. The wheels 24, 26, 28 are connected to the chassis via conventional axles and suspension assemblies (not shown). The tractor 20 includes a hood portion 32 that houses the vehicle engine, and a cab portion 34 that houses driver and passenger seats, a dashboard with various gages, telematics, system controls, etc., and steering wheel for operating the tractor, and sleeping quarters if an optional sleeper section is included.

The tractor 20 further includes one or more chassis fairings that aid in covering one or more structural aspects of the tractor, such as the gas tank, storage boxes, etc. The fairings provide improved air flow, and aid in inhibiting air flow underneath the chassis. As a result, drag on the tractor 20 is reduced. In the embodiment shown in FIG. 1, the one or more chassis fairings include a front chassis fairing 36. The front chassis fairing 36 in some embodiments includes integrated steps for cab ingress/egress. A mid chassis fairing 38 is hingedly coupled to the chassis to provide access to the gas tanks, compressed air tanks, storage boxes, hoses, etc. A rear chassis fairing 40 extends from the aft end of the mid chassis fairing 38 to the leading edge of the forward wheel(s) 28 of the rear wheel assembly 26. In the illustrated embodiment, the trailing edge of the rear chassis fairing 40 is curved and offset from the forward wheel(s) 28 to form a generally constant gap between the wheel and the trailing edge of the fairing.

As best shown in FIG. 2, a quarter fender 42 is mounted to the chassis 22 forward of the rear wheel assembly 26. The quarter fender 42 extends laterally inward from the trailing edge of the rear chassis fairing 40 to a location inboard of the forward wheel(s) 26 of the rear wheel assembly. In the illustrated embodiment, the quarter fender 42 extends vertically from a just below the centerline of the wheel(s) 26 to just above the top of the wheel(s). The quarter fender 42 protects components of the tractor and improves safety for surrounding vehicles by providing a barrier that blocks water splash and road debris cast forward by the tires.

Referring back to FIG. 1, the trailer 50 includes a trailer body with a generally rectangular shape, having a generally planar, vertically oriented front panel 54 and side panels 52, a generally planar top panel 56, and a generally planar bottom panel, sometimes referred to as a cargo-supporting floor deck 58.

The tractor 20 is articulatedly connected to a trailer 50 by a trailer coupling interface 60, such as, for example, a so called fifth wheel, to form a tractor-trailer combination. The connection between the tractor 20 and the trailer 50 forms a space or gap 70 between the top of the quarter fender 42 and the floor deck 58 of the trailer 50. During articulation of the trailer 50 on the tractor fifth wheel 60, as well as during engagement/disengagement of the trailer with the fifth wheel, the bottom panel 58 of the trailer 50 moves relative to the quarter fender 42, which changes the size of the gap 70 between the trailer and the quarter fender.

A flexible quarter fender flap 80 is coupled to the upper end of the quarter fender 42 to extend upward into the gap 70. The flap 80 has a substantially flat, rectangular shape that extends laterally along the top edge of the quarter fender 42. In the illustrated embodiment, the flap 80 is oriented to be raked aftward of a vertical position by a predetermined angle. Other embodiments having different rake angles are also known. In still other known embodiments, the flap 80 is vertically oriented.

The flexible quarter fender flap 80 substantially closes the gap between the rigid quarter fender 42 and the bottom panel 58 of the trailer 50. As previously noted, articulation of the trailer 50 on the tractor fifth wheel 60 and engagement/disengagement of the trailer with the fifth wheel causes the bottom panel 58 of the trailer 50 to move relative to the quarter panel, and therefore, the flap 80. This movement creates a high probability that the flap will contact the bottom panel of the trailer. The flexibility of the flap 80 ensures that neither the flap 80 nor the trailer 50 will be damaged by such contact.

During operation of the vehicle, the flap 80 acts as a barrier between the tires of the rear wheel assembly 26 and the rear face of the cab portion 34 of the tractor 20. In this regard, the flap 80 prevents mud, stones, and debris cast forward by the tires from impacting and potentially damaging the tractor 20. However, while known quarter fender flaps 80 are effective for preventing damage to the cab portion 34 of the tractor 20, the flaps create additional drag that reduces the tractor's aerodynamic efficiency.

Figure 3:
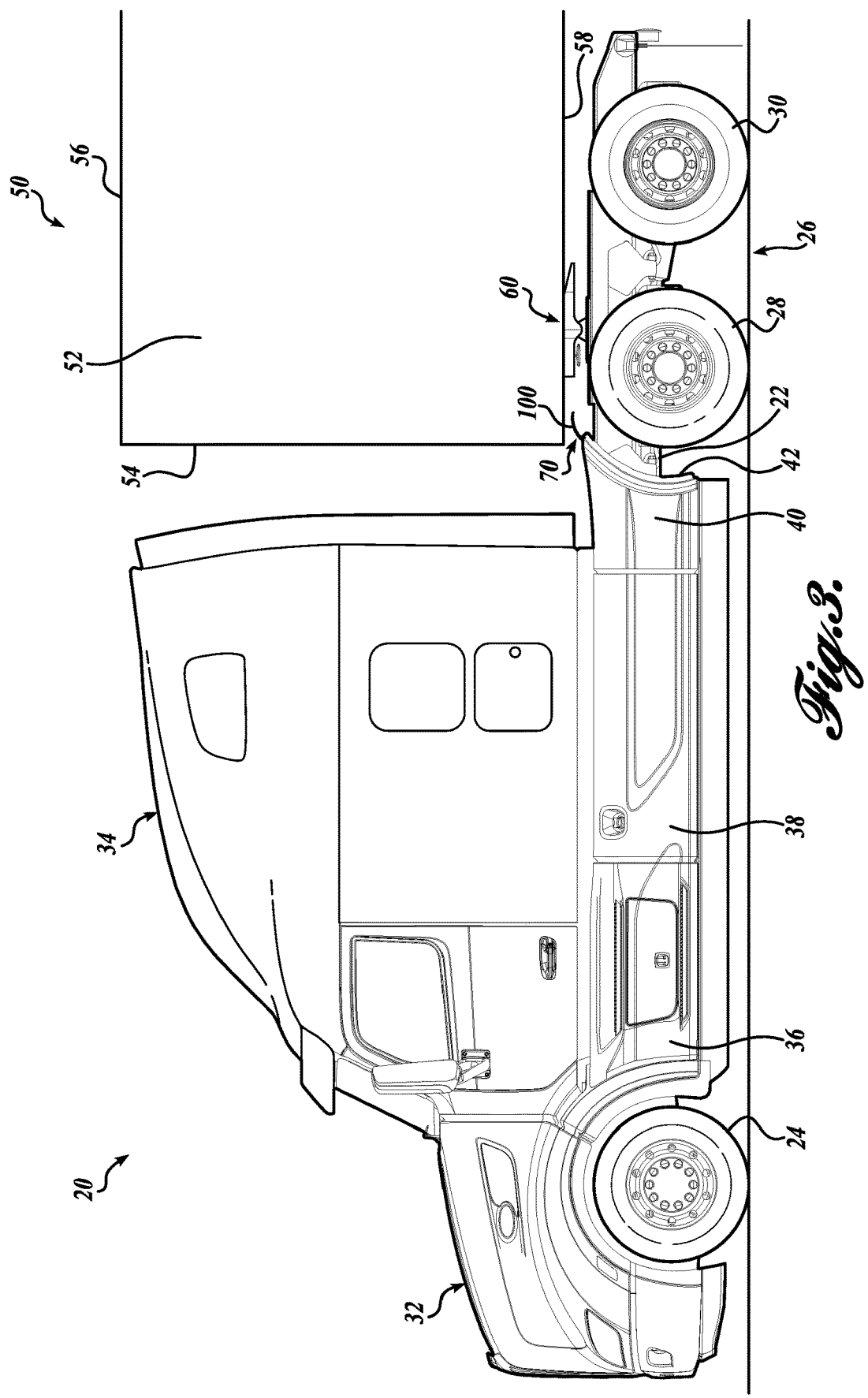
FIG. 3 is a side plan view of a vehicle combination, such as an "over the road" tractor-trailer combination, wherein the vehicle has a quarter fender flap formed in accordance with aspects of the present disclosure.
Figure 4:
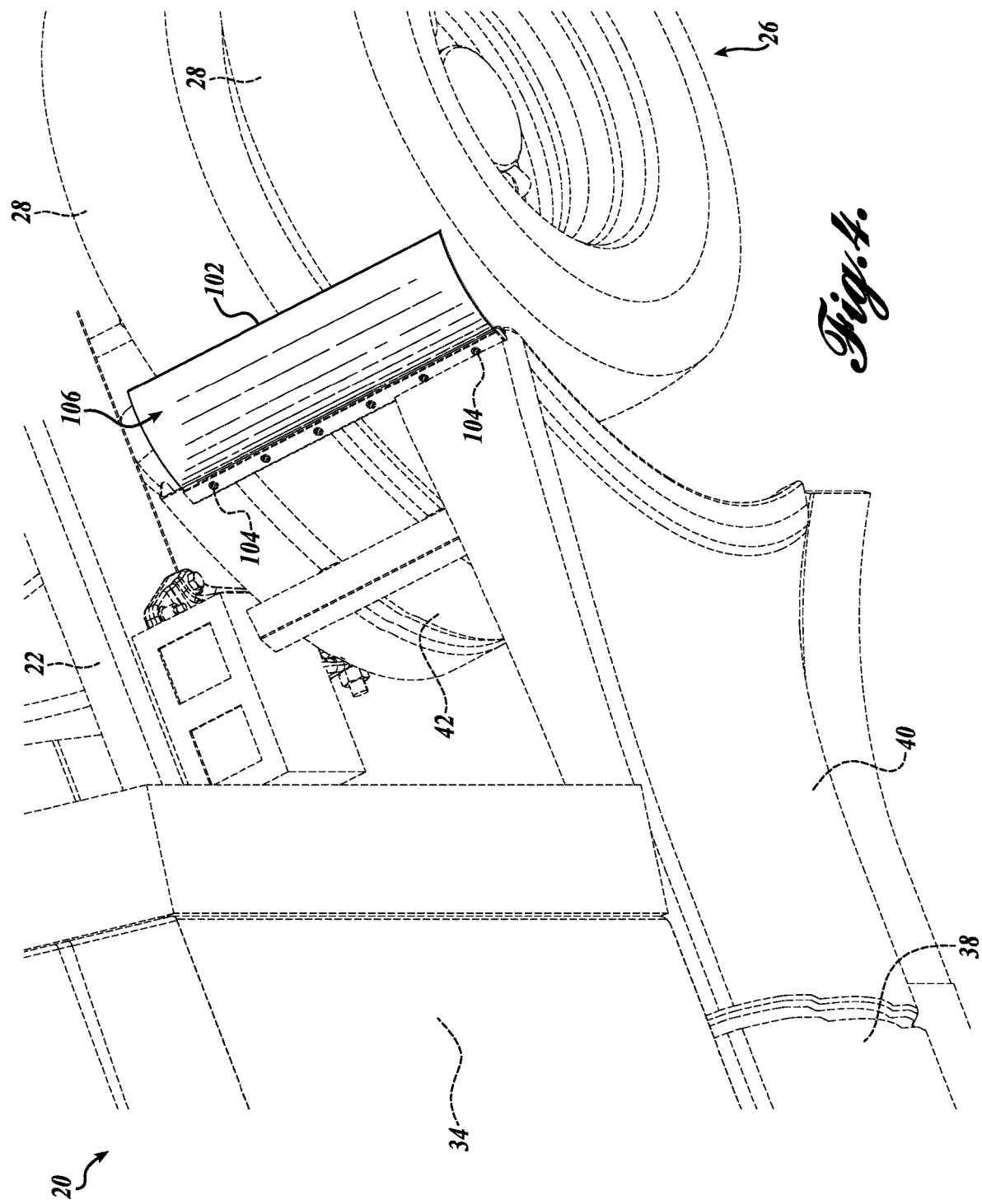
FIG. 4 is an isometric view of the quarter fender flap shown in FIG. 3.

Referring now to FIGS. 3 and 4, a representative embodiment of a quarter fender flap assembly 100 with improved aerodynamic properties is shown. The flap assembly 100 is suitable for mounting during truck production and/or for retrofitting on existing trucks. Accordingly, the flap assembly 100 of FIGS. 3 and 4 is shown installed on the same tractor 20 and trailer 50 combination shown in FIGS. 1 and 2, wherein parts with similar references numbers indicate similar parts. Accordingly, for the sake of brevity, the tractor and trailer components will not be described again.

As best shown in FIG. 4, the flap assembly 100 includes a flap 102 coupled to the upper edge of the quarter fender 42 with a plurality of fasteners 104. The flap 102 is made from a flexible material with sufficient strength and durability to generally maintain its shape during operating conditions and to withstand impact with water and road debris without sustaining significant damage. The flap 106 is also suitably flexible to deflect when contact is made with the trailer 50 so as to avoid damaging the trailer or the flap. Suitable materials include but are not limited to polyethelyne, natural or synthetic rubber, PVC, silicone, neoprene, nitrile, or any combination thereof.

The flap 106 is formed to be substantially straight in a first (lateral) direction and to have an arcuate cross section in a second direction (parallel to the centerline of the truck). In one representative embodiment, the arcuate cross-section has a constant radius. The radius is optionally between about six inches (6") and about three inches (3"). In yet another embodiment, the cross-section comprises one or more portions having a constant radius in combination with portions having a different radius. It will be appreciated that the cross-section is not limited to any particular arcuate shape, and that any non-planar shape can be utilized for the flap. It will further be appreciated that the cross-sectional shape of the flap 106 can be constant or can vary along the length of the flap. These and other profiles are contemplated and should be considered within the scope of the present disclosure.

Referring back to FIG. 3, the flap 106 is mounted to the quarter fender 42 and is positioned to substantially span the gap 70 between the top of the quarter fender 42 and the floor deck 58 of the trailer 50. In the disclosed embodiment, the top of the flap 106 maintains a nominal gap (distance to the floor deck 58 of the trailer 50) of approximately zero to four inches (0-4") when there is no air flow, i.e., when the truck 20 is not moving. It will be appreciated that other configurations are possible, wherein the distance from the flap 106 to the floor deck 58 are smaller, larger, and/or varies along the length of the flap. For instance, the gap may be larger or smaller due to height variations of the tractor fifth wheel 60. In one specific embodiment with a typical fifth wheel height above the chassis 22, the nominal gap between the top of the flap 106 and the floor deck 58 of the trailer 50 would be approximately one to three inches (1-3") when there is no air flow. It will further be appreciated that configurations are possible in which at least a portion of the flap 106 maintains contact with the trailer 50 at least when there is no air flow.

In operation, i.e., when the tractor 20 and trailer 50 combination is traveling forward, the forward face of the flap 106 is exposed to air flow. Unlike the planar forward surfaces of known flaps, the curved forward surface of the present flap 106 promotes lateral acceleration along the surface of the flap. This acceleration results in localized low pressure areas on the front of the flap 106, which results in lower drag on the flap and, therefore, the vehicle.

Figure 5:
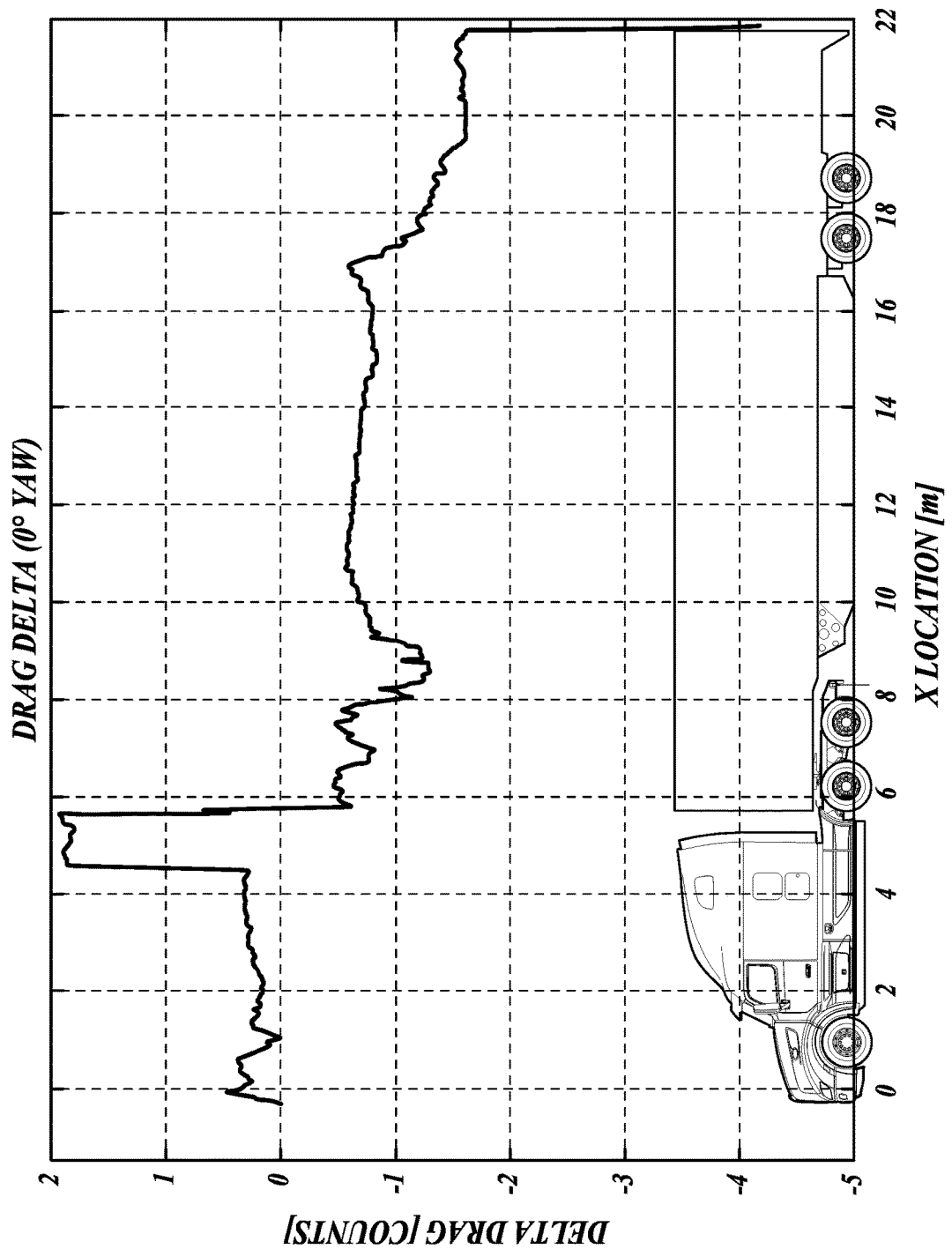
FIG. 5 is a graph of the drag reduction provided by the quarter fender flap of FIG. 4 under a first operating condition.
Figure 6:
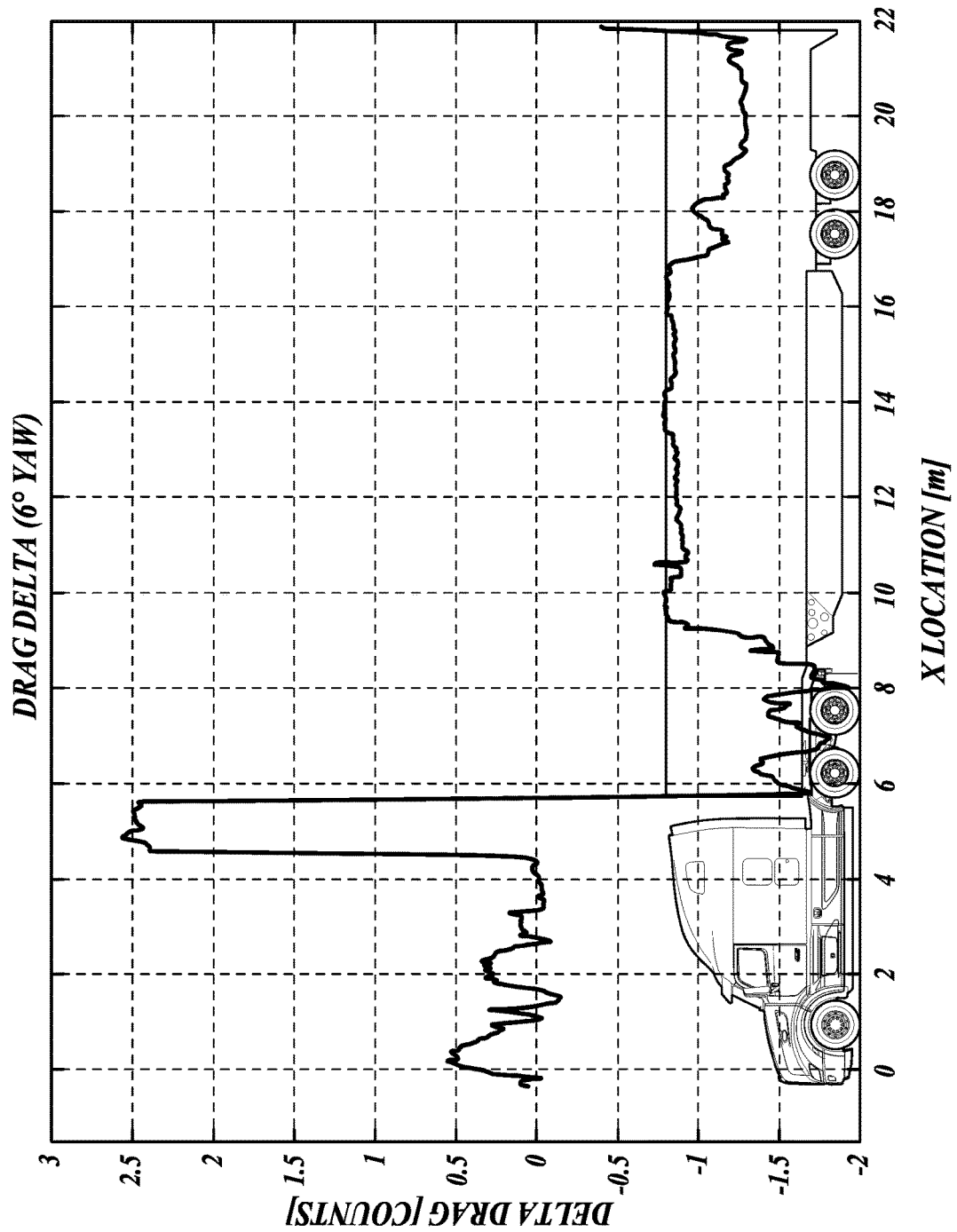
FIG. 6 is a graph of the drag reduction provided by the quarter fender flap of FIG. 4 under a second operating condition.

FIGS. 5 and 6 are graphs showing the difference in drag counts between the baseline (flat flap) and an exemplary curved flap as a function of X location along the vehicle. FIG. 5 represents a 0° yaw condition, and FIG. 6 represents a 6° yaw condition. The location where changes occur correspond to the feature that is causing the change. The drag count reduction between the approximate locations of 4.6 m and 7.7 m represent where changes occur due to the replacement of the planar quarter fender flap with the curved quarter fender flap. The zero yaw case also exhibited also some benefits in trailer aft face drag, likely from the reduced loss of affected flow momentum incurred with the flat flap and not the curved flap.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A quarter fender assembly for a vehicle having a forward end, a wheel, and a vertical surface located forward of the wheel, a trailer coupled to the vehicle, the quarter fender assembly comprising:
    an arcuate panel being sized and configured to be mounted to the vehicle between the wheel and the vertical surface, the arcuate panel including a first end; and
    a flexible flap mounted to the first end of the arcuate panel, the flexible flap having:
        an arcuate outer surface facing away from the wheel;
        an arcuate inner surface opposite to the arcuate outer surface, the arcuate inner surface facing towards the wheel; and
        a second end having a tangent line substantially parallel with a lower surface of the trailer above the wheel.

2. The quarter fender assembly of claim 1, wherein the outer surface of the flap is convex and the inner surface of the flap is concave.

3. The quarter fender assembly of claim 2, wherein the outer surface is convex from a first end of the flap to a second end of the flap opposite to the first end, and the inner surface is concave from the first end of the flap to the second end of the flap.

4. The quarter fender assembly of claim 1, wherein:
    the flap has a constant cross-section in a first direction directed from a right-hand side of the vehicle to a left-hand side of the vehicle; and
    the tangent line extends in a second direction perpendicular to the first direction.

5. The quarter fender assembly of claim 4, wherein the outer surface of the flap defines a portion of a cylindrical surface, the cylindrical surface having an axis perpendicular to a center plane of the vehicle.

6. The quarter fender assembly of claim 5, wherein the cylindrical surface has a radius between about six inches and three inches.

7. The quarter fender assembly of claim 1, wherein the flap comprises a polymeric material.

8. The quarter fender assembly of claim 1, wherein the flap is mounted to and extends along an upper edge at the end of the arcuate panel, the flap mounted to the upper edge by a plurality of fasteners.

9. A quarter fender assembly for a vehicle-trailer combination including a vehicle and a trailer, the vehicle having a wheel positioned adjacent to a rear end of a cab portion, the trailer coupled to a rear end of the vehicle, the trailer having a lower surface positioned above the wheel, the quarter fender assembly including:
    an arcuate panel being sized to be mounted to the vehicle at a location forward of the wheel and below the lower surface of the trailer, the arcuate panel including an arcuate exterior surface and an arcuate interior surface opposite to the arcuate exterior surface, the arcuate interior surface facing towards the wheel and the arcuate exterior surface facing away from the wheel; and
    a flexible flap having a first end mounted to an upper edge of the arcuate panel and a second end opposite to the first end, the flexible flap extending upward toward the lower surface of the trailer in a first direction directed from the first end to the second end, the flexible flap including an arcuate outer surface and an arcuate inner surface opposite to the arcuate outer surface, the arcuate inner surface faces towards the wheel and the arcuate outer surface faces away from the wheel, the second end having a tangent line extending away from or being parallel to the lower surface, wherein the arcuate exterior surface and the arcuate outer surface form an aerodynamic surface configured to direct air flow between the lower surface of the trailer and the arcuate outer surface of the flexible flap.

10. The quarter fender assembly of claim 9, wherein the arcuate outer surface of the flap is convex and the arcuate inner surface is concave.

11. The quarter fender assembly of claim 9, wherein an end of the flap being spaced apart from the lower surface of the trailer by a gap, which has a dimension of approximately four inches or less.

12. The quarter fender assembly of claim 9, wherein the forward surface of the flap defines a portion of a cylindrical surface, the cylindrical surface having an axis perpendicular to a center plane of the vehicle.

13. The quarter fender assembly of claim 12, wherein the cylindrical surface has a radius between about six inches and three inches.

14. The quarter fender assembly to claim 9, wherein the flap has a cross-section that remains constant extending in a second direction directed from a right-hand side of the trailer to a left-hand side of the trailer, the second direction being perpendicular to the first direction.

15. The quarter fender assembly of claim 14, wherein the arcuate outer surface has a first curve and the arcuate inner surface has a second curve, the first curve remains constant extending in the second direction, the second curve remains constant extending in the second direction, the first curve is concave and the second curve is convex.

16. A vehicle, comprising:
a chassis;
a cab portion in mechanical cooperation with the chassis;
a trailer in mechanical cooperation with the chassis, the trailer including a lower surface;
a quarter fender in mechanical cooperation with the chassis;
an flexible flap including a first end and a second end opposite to the first end, the first end coupled to the quarter fender underneath the lower surface of the trailer, the flexible flap further including:
a first side and a second side opposite to the first side, the first and second sides extending from the first end to the second end, the first and second side transverse to the first and second ends;
an arcuate outer surface extending from the first end to the second end, the arcuate outer surface being convex;
an arcuate inner surface extending from the first end to the second end, the arcuate inner surface being concave;
a cross-section having a shape and a normal line extending in a first direction, the first direction extending from the first side to the second side, and, when extending in the first direction, the shape of the cross-section remains the same along any point of the flexible flap between the first side and the second side; and
a tangent line at the second end, the tangent line extending away from the lower surface of the trailer, the tangent line extending in a second direction perpendicular to the first direction.

17. The vehicle of claim 16, wherein the outer surface has a radius from three inches to six inches.

18. The vehicle of claim 16, wherein:
the arcuate outer surface remains convex for a first length of the flexible flap extending from the first side of the flexible flap to the second side of the flexible flap, and remains convex for a second length extending from the first end of the flexible flap to the second end of the flexible flap; and
the arcuate inner surface remains concave for the first length of the flexible flap extending from the first side of the flexible flap to the second side of the flexible flap, and remains concave for the second length extending from the first end of the flexible flap to the second end of the flexible flap.

* * * * *